US006996728B2

(12) United States Patent
Singh

(10) Patent No.: US 6,996,728 B2
(45) Date of Patent: Feb. 7, 2006

(54) MANAGING POWER CONSUMPTION BASED ON UTILIZATION STATISTICS

(75) Inventor: Jitendra K. Singh, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 501 days.

(21) Appl. No.: 10/133,730

(22) Filed: Apr. 26, 2002

(65) Prior Publication Data
US 2003/0204759 A1 Oct. 30, 2003

(51) Int. Cl.
*G06F 1/26* (2006.01)

(52) U.S. Cl. ...................... 713/300; 713/320; 713/322; 713/323; 713/324; 713/340; 700/93; 702/181; 704/240

(58) Field of Classification Search ............... 713/300, 713/320, 322, 323, 324, 340; 700/93; 702/181; 704/240; 718/105
See application file for complete search history.

(56) References Cited

U.S. PATENT DOCUMENTS

| | | | | |
|---|---|---|---|---|
| 5,699,412 A | * | 12/1997 | Polcyn ..................... | 379/88.25 |
| 5,872,972 A | * | 2/1999 | Boland et al. .............. | 718/102 |
| 5,958,058 A | * | 9/1999 | Barrus ........................ | 713/320 |
| 5,993,038 A | * | 11/1999 | Sitbon et al. ............... | 709/202 |
| 6,128,642 A | * | 10/2000 | Doraswamy et al. ....... | 709/201 |
| 6,687,735 B1 | * | 2/2004 | Logston et al. ............ | 709/203 |
| 6,895,520 B1 | * | 5/2005 | Altmejd et al. ............ | 713/324 |
| 2003/0065959 A1 | * | 4/2003 | Morrow ...................... | 713/300 |

OTHER PUBLICATIONS

Fisher, Bob, Least Squares Approaches, Mar. 28, 1997, http://homepages.inf.ed.ac.uk/rbf/CVonline/LOCAL_COPIES/BMVA96Tut/node7.html, p. 1.*

* cited by examiner

Primary Examiner—Lynne H. Browne
Assistant Examiner—Nitin C. Patel
(74) Attorney, Agent, or Firm—Tuan V. Ngo

(57) ABSTRACT

The present invention, in various embodiments, provides techniques for managing system power. In one embodiment, system compute loads and/or system resources invoked by services running on the system consume power. To better manage power consumption, the spare capacity of a system resource is periodically measured, and if this spare capacity is outside a predefined range, then the resource operation is adjusted, e.g., the CPU speed is increased or decreased, so that the spare capacity is within the range. Further, the spare capacity is kept as close to zero as practical, and this spare capacity is determined based on the statistical distribution of a number of utilization values of the resources, which is also taken periodically. The spare capacity is also calculated based on considerations of the probability that the system resources are saturated. In one embodiment, to maintain the services required by a Service Level Agreement (SLA), a correlation between an SLA parameter and a resource utilization is determined. In addition to other factors and the correlation of the parameters, the spare capacity of the resource utilization is adjusted based on the spare capacity of the SLA parameter. Various embodiments include optimizing system performance before calculating system spare capacity, saving power for system groups or clusters, saving power for special conditions such as brown-out, high temperature, etc.

31 Claims, 10 Drawing Sheets

TABLE 300A

| m | 0 | 0.01 | 0.02 | 0.03 | 0.04 | 0.05 | 0.06 | 0.07 | 0.08 | 0.09 |
|---|---|---|---|---|---|---|---|---|---|---|
| -3.0 | 99.865 | 99.861 | 99.856 | 99.851 | 99.846 | 99.841 | 99.836 | 99.831 | 99.825 | 99.819 |
| -2.9 | 99.813 | 99.807 | 99.801 | 99.795 | 99.788 | 99.781 | 99.774 | 99.767 | 99.760 | 99.752 |
| -2.8 | 99.744 | 99.736 | 99.728 | 99.720 | 99.711 | 99.702 | 99.693 | 99.683 | 99.674 | 99.664 |
| -2.7 | 99.653 | 99.643 | 99.632 | 99.621 | 99.609 | 99.598 | 99.585 | 99.573 | 99.560 | 99.547 |
| -2.6 | 99.534 | 99.520 | 99.506 | 99.492 | 99.477 | 99.461 | 99.446 | 99.430 | 99.413 | 99.396 |
| -2.5 | 99.379 | 99.361 | 99.343 | 99.324 | 99.305 | 99.286 | 99.266 | 99.245 | 99.224 | 99.202 |
| -2.4 | 99.180 | 99.158 | 99.134 | 99.111 | 99.086 | 99.061 | 99.036 | 99.010 | 98.983 | 98.956 |
| -2.3 | 98.928 | 98.899 | 98.870 | 98.840 | 98.809 | 98.778 | 98.745 | 98.713 | 98.679 | 98.645 |
| -2.2 | 98.610 | 98.574 | 98.537 | 98.500 | 98.461 | 98.422 | 98.382 | 98.341 | 98.300 | 98.257 |
| -2.1 | 98.214 | 98.169 | 98.124 | 98.077 | 98.030 | 97.982 | 97.932 | 97.882 | 97.831 | 97.778 |
| -2.0 | 97.725 | 97.670 | 97.615 | 97.558 | 97.500 | 97.441 | 97.381 | 97.320 | 97.257 | 97.193 |
| -1.9 | 97.128 | 97.062 | 96.995 | 96.926 | 96.856 | 96.784 | 96.712 | 96.638 | 96.562 | 96.485 |
| -1.8 | 96.407 | 96.327 | 96.246 | 96.164 | 96.080 | 95.994 | 95.907 | 95.818 | 95.728 | 95.637 |
| -1.7 | 95.543 | 95.449 | 95.352 | 95.254 | 95.154 | 95.053 | 94.950 | 94.845 | 94.738 | 94.630 |
| -1.6 | 94.520 | 94.408 | 94.295 | 94.179 | 94.062 | 93.943 | 93.822 | 93.699 | 93.574 | 93.448 |
| -1.5 | 93.319 | 93.189 | 93.056 | 92.922 | 92.785 | 92.647 | 92.507 | 92.364 | 92.220 | 92.073 |
| -1.4 | 91.924 | 91.774 | 91.621 | 91.466 | 91.309 | 91.149 | 90.988 | 90.824 | 90.658 | 90.490 |
| -1.3 | 90.320 | 90.147 | 89.973 | 89.796 | 89.617 | 89.435 | 89.251 | 89.065 | 88.877 | 88.686 |
| -1.2 | 88.493 | 88.298 | 88.100 | 87.900 | 87.698 | 87.493 | 87.286 | 87.076 | 86.864 | 86.650 |
| -1.1 | 86.433 | 86.214 | 85.993 | 85.769 | 85.543 | 85.314 | 85.083 | 84.849 | 84.614 | 84.375 |
| -1.0 | 84.134 | 83.891 | 83.646 | 83.398 | 83.147 | 82.894 | 82.639 | 82.381 | 82.121 | 81.859 |
| -0.9 | 81.594 | 81.327 | 81.057 | 80.785 | 80.511 | 80.234 | 79.955 | 79.673 | 79.389 | 79.103 |
| -0.8 | 78.814 | 78.524 | 78.230 | 77.935 | 77.637 | 77.337 | 77.035 | 76.730 | 76.424 | 76.115 |
| -0.7 | 75.804 | 75.490 | 75.175 | 74.857 | 74.537 | 74.215 | 73.891 | 73.565 | 73.237 | 72.907 |
| -0.6 | 72.575 | 72.240 | 71.904 | 71.566 | 71.226 | 70.884 | 70.540 | 70.194 | 69.847 | 69.497 |
| -0.5 | 69.146 | 68.793 | 68.439 | 68.082 | 67.724 | 67.364 | 67.003 | 66.640 | 66.276 | 65.910 |
| -0.4 | 65.542 | 65.173 | 64.803 | 64.431 | 64.058 | 63.683 | 63.307 | 62.930 | 62.552 | 62.172 |
| -0.3 | 61.791 | 61.409 | 61.026 | 60.642 | 60.257 | 59.871 | 59.483 | 59.095 | 58.706 | 58.317 |
| -0.2 | 57.926 | 57.535 | 57.142 | 56.749 | 56.356 | 55.962 | 55.567 | 55.172 | 54.776 | 54.380 |
| -0.1 | 53.983 | 53.586 | 53.188 | 52.790 | 52.392 | 51.994 | 51.595 | 51.197 | 50.798 | 50.399 |
| 0 | 50.000 | 49.601 | 49.202 | 48.803 | 48.405 | 48.006 | 47.608 | 47.210 | 46.812 | 46.414 |
| 0.1 | 46.017 | 45.620 | 45.224 | 44.828 | 44.433 | 44.038 | 43.644 | 43.251 | 42.858 | 42.465 |
| 0.2 | 42.074 | 41.683 | 41.294 | 40.905 | 40.517 | 40.129 | 39.743 | 39.358 | 38.974 | 38.591 |
| 0.3 | 38.209 | 37.828 | 37.448 | 37.070 | 36.693 | 36.317 | 35.942 | 35.569 | 35.197 | 34.827 |
| 0.4 | 34.458 | 34.090 | 33.724 | 33.360 | 32.997 | 32.636 | 32.276 | 31.918 | 31.561 | 31.207 |
| 0.5 | 30.854 | 30.503 | 30.153 | 29.806 | 29.460 | 29.116 | 28.774 | 28.434 | 28.096 | 27.760 |
| 0.6 | 27.425 | 27.093 | 26.763 | 26.435 | 26.109 | 25.785 | 25.463 | 25.143 | 24.825 | 24.510 |
| 0.7 | 24.196 | 23.885 | 23.576 | 23.270 | 22.965 | 22.663 | 22.363 | 22.065 | 21.770 | 21.476 |
| 0.8 | 21.186 | 20.897 | 20.611 | 20.327 | 20.045 | 19.766 | 19.489 | 19.215 | 18.943 | 18.673 |
| 0.9 | 18.406 | 18.141 | 17.879 | 17.619 | 17.361 | 17.106 | 16.853 | 16.602 | 16.354 | 16.109 |
| 1 | 15.866 | 15.625 | 15.386 | 15.151 | 14.917 | 14.686 | 14.457 | 14.231 | 14.007 | 13.786 |
| 1.1 | 13.567 | 13.350 | 13.136 | 12.924 | 12.714 | 12.507 | 12.302 | 12.100 | 11.900 | 11.702 |
| 1.2 | 11.507 | 11.314 | 11.123 | 10.935 | 10.749 | 10.565 | 10.383 | 10.204 | 10.027 | 9.853 |
| 1.3 | 9.680 | 9.510 | 9.342 | 9.176 | 9.012 | 8.851 | 8.691 | 8.534 | 8.379 | 8.226 |
| 1.4 | 8.076 | 7.927 | 7.780 | 7.636 | 7.493 | 7.353 | 7.215 | 7.078 | 6.944 | 6.811 |
| 1.5 | 6.681 | 6.552 | 6.426 | 6.301 | 6.178 | 6.057 | 5.938 | 5.821 | 5.705 | 5.592 |
| 1.6 | 5.480 | 5.370 | 5.262 | 5.155 | 5.050 | 4.947 | 4.846 | 4.746 | 4.648 | 4.551 |
| 1.7 | 4.457 | 4.363 | 4.272 | 4.182 | 4.093 | 4.006 | 3.920 | 3.836 | 3.754 | 3.673 |
| 1.8 | 3.593 | 3.515 | 3.438 | 3.362 | 3.288 | 3.216 | 3.144 | 3.074 | 3.005 | 2.938 |
| 1.9 | 2.872 | 2.807 | 2.743 | 2.680 | 2.619 | 2.559 | 2.500 | 2.442 | 2.385 | 2.330 |
| 2 | 2.275 | 2.222 | 2.169 | 2.118 | 2.068 | 2.018 | 1.970 | 1.923 | 1.876 | 1.831 |

*FIG. 3A*

TABLE 300A (Continuation)

| | | | | | | | | | |
|---|---|---|---|---|---|---|---|---|---|
| 2.1 | 1.786 | 1.743 | 1.700 | 1.659 | 1.618 | 1.578 | 1.539 | 1.500 | 1.463 | 1.426 |
| 2.2 | 1.390 | 1.355 | 1.321 | 1.287 | 1.255 | 1.222 | 1.191 | 1.160 | 1.130 | 1.101 |
| 2.3 | 1.072 | 1.044 | 1.017 | 0.990 | 0.964 | 0.939 | 0.914 | 0.889 | 0.866 | 0.842 |
| 2.4 | 0.820 | 0.798 | 0.776 | 0.755 | 0.734 | 0.714 | 0.695 | 0.676 | 0.657 | 0.639 |
| 2.5 | 0.621 | 0.604 | 0.587 | 0.570 | 0.554 | 0.539 | 0.523 | 0.508 | 0.494 | 0.480 |
| 2.6 | 0.466 | 0.453 | 0.440 | 0.427 | 0.415 | 0.402 | 0.391 | 0.379 | 0.368 | 0.357 |
| 2.7 | 0.347 | 0.336 | 0.326 | 0.317 | 0.307 | 0.298 | 0.289 | 0.280 | 0.272 | 0.264 |
| 2.8 | 0.256 | 0.248 | 0.240 | 0.233 | 0.226 | 0.219 | 0.212 | 0.205 | 0.199 | 0.193 |
| 2.9 | 0.187 | 0.181 | 0.175 | 0.169 | 0.164 | 0.159 | 0.154 | 0.149 | 0.144 | 0.139 |
| 3 | 0.135 | 0.131 | 0.126 | 0.122 | 0.118 | 0.114 | 0.111 | 0.107 | 0.104 | 0.100 |

FIG. 3A (Continuation)

Note:
    1st Row:   Value of m in 2 decimal points
    1st Column: Value of m in 1 decimal point

TABLE 300B

| P | 0 | 0.2 | 0.4 | 0.6 | 0.8 | 1 | 1.2 | 1.4 | 1.6 | 1.8 |
|---|---|---|---|---|---|---|---|---|---|---|
| 0 |  | 2.8782 | 2.65209 | 2.51213 | 2.4089 | 2.3263 | 2.2571 | 2.19728 | 2.1444 | 2.0969 |
| 2 | 2.0537 | 2.0141 | 1.97737 | 1.94314 | 1.911 | 1.8808 | 1.8522 | 1.82501 | 1.7991 | 1.7744 |
| 4 | 1.7507 | 1.7279 | 1.70604 | 1.68494 | 1.6646 | 1.6449 | 1.6258 | 1.60725 | 1.5893 | 1.5718 |
| 6 | 1.5548 | 1.5382 | 1.52203 | 1.50626 | 1.4909 | 1.4758 | 1.4611 | 1.44663 | 1.4325 | 1.4187 |
| 8 | 1.4051 | 1.3917 | 1.37866 | 1.36581 | 1.3532 | 1.3408 | 1.3285 | 1.31652 | 1.3047 | 1.293 |
| 10 | 1.2816 | 1.2702 | 1.25908 | 1.24809 | 1.2372 | 1.2265 | 1.216 | 1.20553 | 1.1952 | 1.185 |
| 12 | 1.175 | 1.165 | 1.15522 | 1.1455 | 1.1359 | 1.1264 | 1.117 | 1.10768 | 1.0985 | 1.0893 |
| 14 | 1.0803 | 1.0714 | 1.06252 | 1.05375 | 1.0451 | 1.0364 | 1.0279 | 1.01943 | 1.011 | 1.0027 |
| 16 | 0.9945 | 0.9863 | 0.97815 | 0.97009 | 0.9621 | 0.9542 | 0.9463 | 0.93848 | 0.9307 | 0.923 |
| 18 | 0.9154 | 0.9078 | 0.90023 | 0.89273 | 0.8853 | 0.8779 | 0.8706 | 0.86325 | 0.856 | 0.8488 |
| 20 | 0.8416 | 0.8345 | 0.82742 | 0.82038 | 0.8134 | 0.8064 | 0.7995 | 0.79262 | 0.7858 | 0.779 |
| 22 | 0.7722 | 0.7655 | 0.75875 | 0.75208 | 0.7454 | 0.7388 | 0.7323 | 0.72574 | 0.7192 | 0.7128 |
| 24 | 0.7063 | 0.6999 | 0.69349 | 0.68713 | 0.6808 | 0.6745 | 0.6682 | 0.66196 | 0.6557 | 0.6495 |
| 26 | 0.6433 | 0.6372 | 0.63106 | 0.62496 | 0.6189 | 0.6128 | 0.6068 | 0.60076 | 0.5948 | 0.5888 |
| 28 | 0.5828 | 0.5769 | 0.571 | 0.56511 | 0.5592 | 0.5534 | 0.5476 | 0.54174 | 0.5359 | 0.5302 |
| 30 | 0.5244 | 0.5187 | 0.51293 | 0.50722 | 0.5015 | 0.4958 | 0.4902 | 0.48454 | 0.4789 | 0.4733 |
| 32 | 0.4677 | 0.4621 | 0.45654 | 0.45099 | 0.4454 | 0.4399 | 0.4344 | 0.42889 | 0.4234 | 0.4179 |
| 34 | 0.4125 | 0.407 | 0.40157 | 0.39614 | 0.3907 | 0.3853 | 0.3799 | 0.37454 | 0.3692 | 0.3638 |
| 36 | 0.3585 | 0.3531 | 0.34779 | 0.34247 | 0.3372 | 0.3319 | 0.3266 | 0.32128 | 0.316 | 0.3107 |
| 38 | 0.3055 | 0.3002 | 0.29499 | 0.28976 | 0.2845 | 0.2793 | 0.2741 | 0.26891 | 0.2637 | 0.2585 |
| 40 | 0.2533 | 0.2482 | 0.24301 | 0.23785 | 0.2327 | 0.2275 | 0.2224 | 0.21727 | 0.2121 | 0.207 |
| 42 | 0.2019 | 0.1968 | 0.19167 | 0.18657 | 0.1815 | 0.1764 | 0.1713 | 0.1662 | 0.1611 | 0.156 |
| 44 | 0.151 | 0.1459 | 0.14084 | 0.13577 | 0.1307 | 0.1257 | 0.1206 | 0.11556 | 0.1105 | 0.1055 |
| 46 | 0.1004 | 0.0954 | 0.09036 | 0.08533 | 0.0803 | 0.0753 | 0.0702 | 0.06522 | 0.0602 | 0.0552 |
| 48 | 0.0502 | 0.0451 | 0.04012 | 0.0351 | 0.0301 | 0.0251 | 0.0201 | 0.01504 | 0.01 | 0.005 |
| 50 | 0 | -0.005 | -0.01 | -0.015 | -0.0201 | -0.0251 | -0.0301 | -0.0351 | -0.0401 | -0.0451 |
| 52 | -0.05 | -0.0552 | -0.0602 | -0.0652 | -0.0702 | -0.0753 | -0.0803 | -0.0853 | -0.0904 | -0.0954 |
| 54 | -0.1 | -0.1055 | -0.1105 | -0.1156 | -0.1206 | -0.1257 | -0.1307 | -0.1358 | -0.1408 | -0.1459 |
| 56 | -0.151 | -0.156 | -0.1611 | -0.1662 | -0.1713 | -0.1764 | -0.1815 | -0.1866 | -0.1917 | -0.1968 |
| 58 | -0.202 | -0.207 | -0.2121 | -0.2173 | -0.2224 | -0.2275 | -0.2327 | -0.2378 | -0.243 | -0.2482 |
| 60 | -0.253 | -0.2585 | -0.2637 | -0.2689 | -0.2741 | -0.2793 | -0.2845 | -0.2898 | -0.295 | -0.3002 |
| 62 | -0.305 | -0.3107 | -0.316 | -0.3213 | -0.3266 | -0.3319 | -0.3372 | -0.3425 | -0.3478 | -0.3531 |
| 64 | -0.358 | -0.3638 | -0.3692 | -0.3745 | -0.3799 | -0.3853 | -0.3907 | -0.3961 | -0.4016 | -0.407 |
| 66 | -0.412 | -0.4179 | -0.4234 | -0.4289 | -0.4344 | -0.4399 | -0.4454 | -0.451 | -0.4565 | -0.4621 |
| 68 | -0.468 | -0.4733 | -0.4789 | -0.4845 | -0.4902 | -0.4958 | -0.5015 | -0.5072 | -0.5129 | -0.5187 |
| 70 | -0.524 | -0.5302 | -0.5359 | -0.5417 | -0.5476 | -0.5534 | -0.5592 | -0.5651 | -0.571 | -0.5769 |
| 72 | -0.583 | -0.5888 | -0.5948 | -0.6008 | -0.6068 | -0.6128 | -0.6189 | -0.625 | -0.6311 | -0.6372 |
| 74 | -0.643 | -0.6495 | -0.6557 | -0.662 | -0.6682 | -0.6745 | -0.6808 | -0.6871 | -0.6935 | -0.6999 |
| 76 | -0.706 | -0.7128 | -0.7192 | -0.7257 | -0.7323 | -0.7388 | -0.7454 | -0.7521 | -0.7588 | -0.7655 |
| 78 | -0.772 | -0.779 | -0.7858 | -0.7926 | -0.7995 | -0.8064 | -0.8134 | -0.8204 | -0.8274 | -0.8345 |
| 80 | -0.842 | -0.8488 | -0.856 | -0.8632 | -0.8706 | -0.8779 | -0.8853 | -0.8927 | -0.9002 | -0.9078 |
| 82 | -0.915 | -0.923 | -0.9307 | -0.9385 | -0.9463 | -0.9542 | -0.9621 | -0.9701 | -0.9782 | -0.9863 |
| 84 | -0.994 | -1.0027 | -1.011 | -1.0194 | -1.0279 | -1.0364 | -1.0451 | -1.0537 | -1.0625 | -1.0714 |
| 86 | -1.08 | -1.0893 | -1.0985 | -1.1077 | -1.117 | -1.1264 | -1.1359 | -1.1455 | -1.1552 | -1.165 |
| 88 | -1.175 | -1.185 | -1.1952 | -1.2055 | -1.216 | -1.2265 | -1.2372 | -1.2481 | -1.2591 | -1.2702 |
| 90 | -1.282 | -1.293 | -1.3047 | -1.3165 | -1.3285 | -1.3408 | -1.3532 | -1.3658 | -1.3787 | -1.3917 |
| 92 | -1.405 | -1.4187 | -1.4325 | -1.4466 | -1.4611 | -1.4758 | -1.4909 | -1.5063 | -1.522 | -1.5382 |
| 94 | -1.555 | -1.5718 | -1.5893 | -1.6072 | -1.6258 | -1.6449 | -1.6646 | -1.6849 | -1.706 | -1.7279 |
| 96 | -1.751 | -1.7744 | -1.7991 | -1.825 | -1.8522 | -1.8808 | -1.911 | -1.9431 | -1.9774 | -2.0141 |
| 98 | -2.054 | -2.0969 | -2.1444 | -2.1973 | -2.2571 | -2.3263 | -2.4089 | -2.5121 | -2.6521 | -2.8782 |

1st Row: Value of P in internal of .2
1st Column: Value of P in internal of 2

FIG. 3B

MANAGING POWER CONSUMPTION BASED ON UTILIZATION STATISTICS

FIELD OF THE INVENTION

The present invention relates generally to system power and, more specifically, to managing such power.

BACKGROUND OF THE INVENTION

Computer systems including network servers that use electric grids generally operate at full power as long as the power is turned on regardless of the compute load, which is the amount of computation needed to be performed in order to deliver computational services to end users. Compute loads include, for example, central processing unit (CPU) cycles, disk access, memory access, input-output (I/O) access, etc. Laptop computers (laptops) and battery-powered systems entertain various modes of operation such as "sleep," "standby," "hibernate," etc., which reduces power when the system is inactive. However, these power-saving modes are usually based on whether the system is or is not in use, e.g., active or inactive, but not on system performance or system loads. Further, these modes switch the system to full power operation if there is any user activity even though the activity does not require full power. Because servers are seldom completely inactive, they run at full power most of the time without greatly benefiting from the power-save modes that work acceptably for laptops and battery-powered systems. Based on the foregoing, it is desirable that mechanisms be provided to solve the above deficiencies and related problems.

SUMMARY OF THE INVENTION

The present invention, in various embodiments, provides techniques for managing system power. In one embodiment, system compute loads and/or system resources invoked by services running on the system consume power. To better manage power consumption, the spare capacity of a system resource is periodically measured, and if this spare capacity is outside a predefined range, then the resource operation is adjusted, e.g., the CPU speed is increased or decreased, so that the spare capacity is within the range. Further, the spare capacity is kept as close to zero as practical, and this spare capacity is determined based on the statistical distribution of a number of utilization values of the resources, which is also taken periodically. The spare capacity is also calculated based on considerations of the probability that the system resources are saturated.

In one embodiment, to maintain the services required by a Service Level Agreement (SLA), a correlation between an SLA parameter and a resource utilization is determined. In addition to other factors and the correlation of the parameters, the spare capacity of the resource utilization is adjusted based on the spare capacity of the SLA parameter.

Various embodiments include optimizing system performance before calculating system spare capacity, saving power for system groups or clusters, saving power for special conditions such as brown-out, high temperature, etc.

BRIEF DESCRIPTION OF THE DRAWINGS

The present invention is illustrated by way of example, and not by way of limitation, in the figures of the accompanying drawings in which like reference numerals refer to similar elements and in which:

FIG. 3A shows a table for finding a probability given a parameter m;

FIG. 3B shows a table for finding a parameter m given a probability P;

DETAILED DESCRIPTION OF THE PREFERRED EMBODIMENT

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Network Overview

Figure 1:
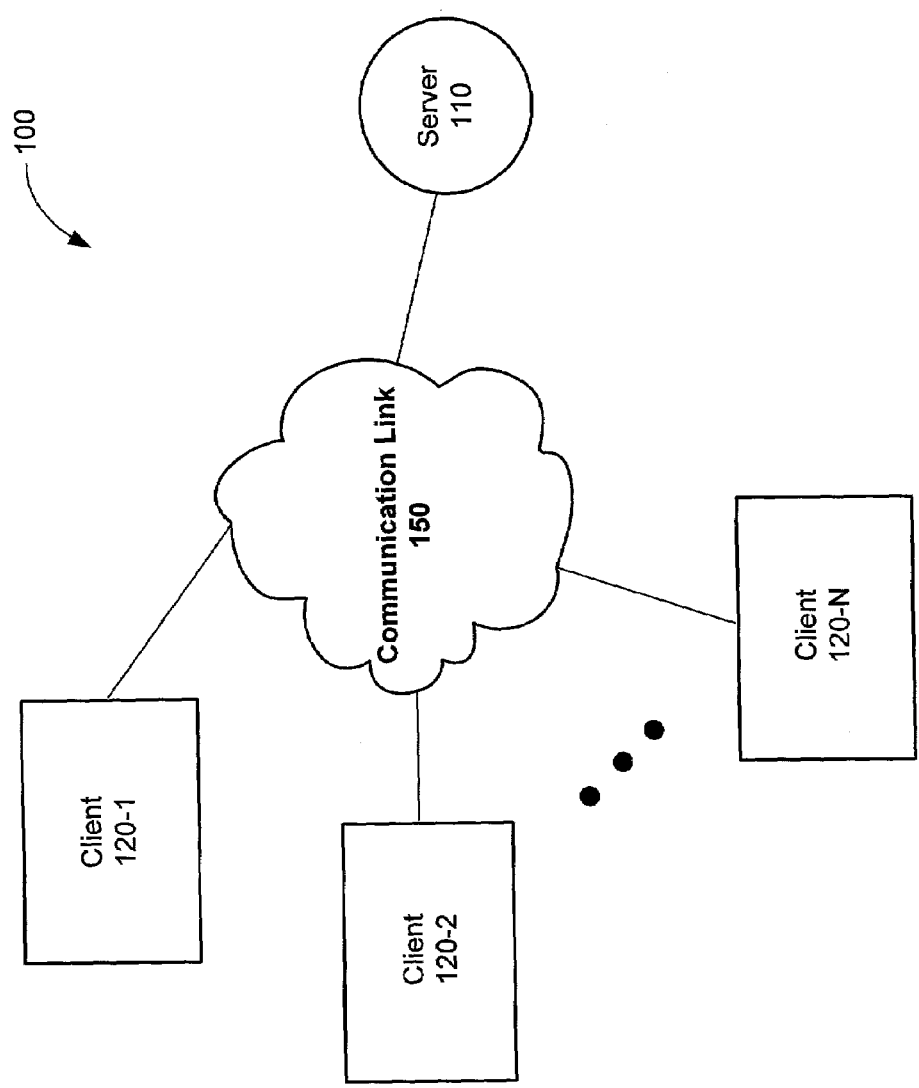
FIG. 1 shows a network upon which embodiments of the invention may be implemented.

FIG. 1 shows a network 100 upon which embodiments of the invention may be implemented. Network 100 includes a server 110, a plurality of clients 120-1, 120-2, . . . , 120-N, and a communication link 150. In one embodiment, business institutions use network 100 to provide computer services to their customers in which a server 110 provides the services via client systems 120 to the customers. Usually, these institutions and their customers, based on a Service Level Agreement (SLA), set the criteria for the services to be provided, such as, within some time units, server 110 is to service a submitted request, to authenticate a number of users, to provide a certain number of web pages, etc. Network 100 is used in this document as an example, variations are within the scope of the invention. For example, server 110 can stand by itself, and thus is not on communication link 150; a plurality of servers 110 may operate in a cluster or in a load-balancing manner; network 100 can be of various network arrangements; etc.

Server 110 is any kind of computer and runs various services including, for example, web, database, mail, security, communications, accounting, load balancing, file storage services, etc. This list of services is used for illustration purposes; other services, programs, loads, and their equivalences run by server 110 are within the scope of the invention. To request services, a user or a program application sends a request from a client 120 or a server (not shown) through communication link 150 to server 110.

Communication link 150 is a mechanism for server 110 to communicate with clients 120. Communication link 150 may be a single network or a combination of networks that utilizes one or a combination of communication protocols such as the Transmission Control Protocol/Internet Protocol (TCP/IP), the Public Switched Telephone Network (PSTN), the Digital Subscriber Lines (DSL), the cable network, the satellite-compliant, the wireless-compliant, etc. Examples of communication link 150 include network media, interconnection fabrics, rings, crossbars, etc. Each client 120 may use different communication links to communicate with servers 110. In one embodiment, communication link 150 is the Internet.

Computer System Overview

Figure 2:
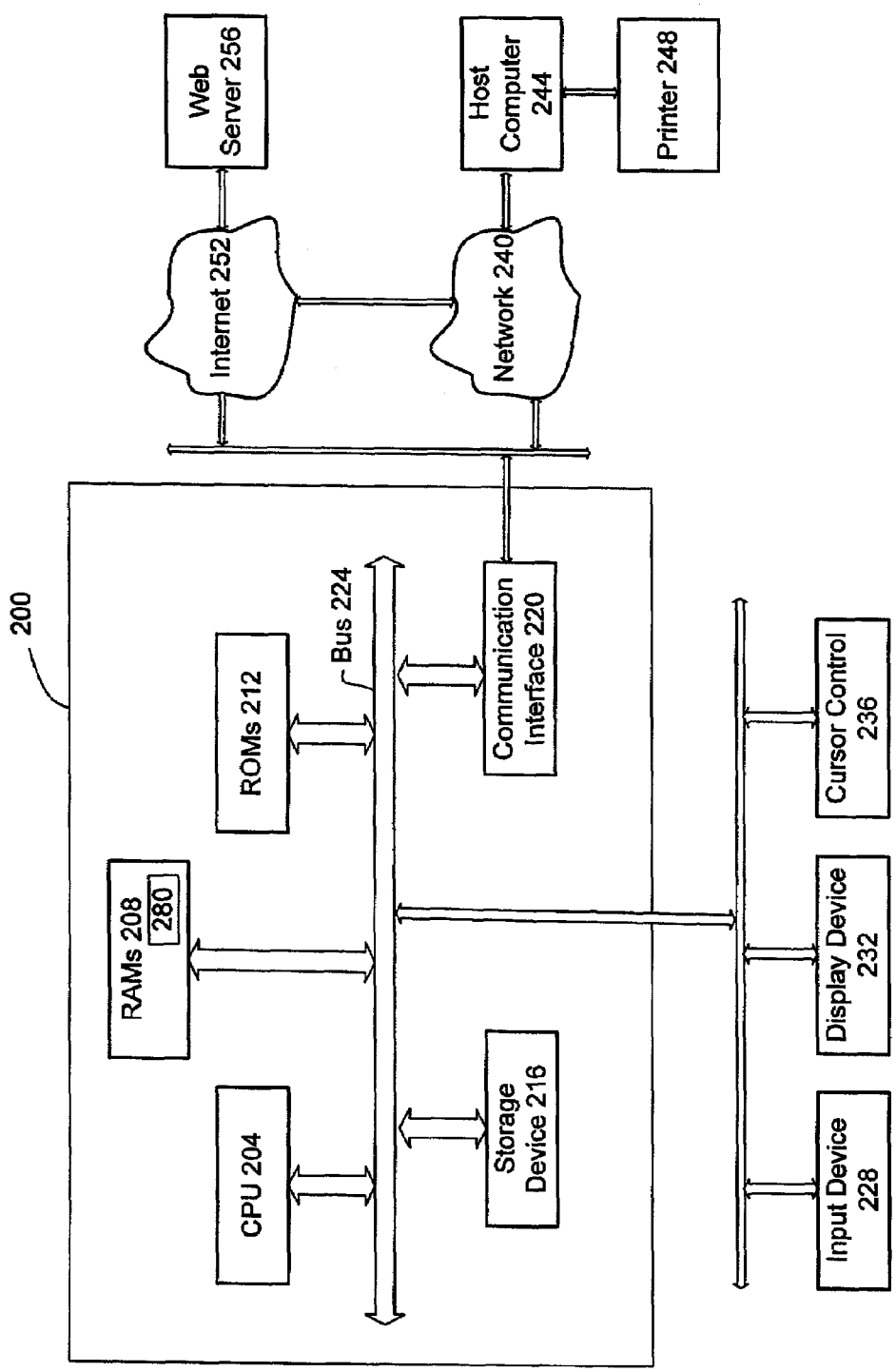
FIG. 2 shows an exemplary computer upon which embodiments of the invention may be implemented.

FIG. 2 is a block diagram showing a computer system 200 upon which embodiments of the invention may be implemented. For example, computer system 200 may be implemented as a server 110, a client 120, etc. In one embodiment, computer system 200 includes a central processing unit (CPU) 204, random access memories (RAMs) 208, read-only memories (ROMs) 212, a storage device 216, and a communication interface 220, all of which are connected to a bus 224.

CPU 204 controls logic, processes information, and coordinates activities within computer system 200. Normally, CPU 204 executes instructions stored in RAMs 208 and ROMs 212, by, for example, coordinating the movement of data from input device 228 to display device 232. CPU 204 may include one or a plurality of processors.

RAMs 208 are usually referred to as main memory or memory system, and temporarily store information and instructions to be executed by CPU 204. RAMs 208 may be in the form of single in-line memory modules (SIMMs) or dual in-line memory module (DIMMs). Information in RAMs 208 may be obtained from input device 228 or generated by CPU 204 as part of the algorithmic processes required by the instructions that are executed by CPU 204.

ROMs 212 store information and instructions that, once written in a ROM chip, are read-only and are not modified or removed. In one embodiment, ROMs 212 store commands for configurations and initial operations of computer system 200.

Storage device 216, such as floppy disks, disk drives, or tape drives, durably stores information for use by computer system 200.

Communication interface 220 enables computer system 200 to interface with other computers or devices. Communication interface 220 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 220 may also allow wireless communications.

Bus 224 can be any communication mechanism for communicating information for use by computer system 200. In the example of FIG. 2, bus 224 is a media for transferring data between CPU 204, RAMs 208, ROMs 212, storage device 216, communication interface 220, etc.

Computer system 200 is typically coupled to an input device 228, a display device 232, and a cursor control 236. Input device 228, such as a keyboard including alphanumeric and other keys, communicates information and commands to CPU 204. Display device 232, such as a cathode ray tube (CRT), displays information to users of computer system 200. Cursor control 236, such as a mouse, a trackball, or cursor direction keys, communicates direction information and commands to CPU 204 and controls cursor movement on display device 232.

Computer system 200 may communicate with other computers or devices through one or more networks. For example, computer system 200, using communication interface 220, communicates through a network 240 to another computer 244 connected to a printer 248, or through the world wide web 252 to a server 256. The world wide web 252 is commonly referred to as the "Internet." Alternatively, computer system 200 may access the Internet 252 via network 240.

Computer system 200 may be used to implement the techniques disclosed herein. In various embodiments, CPU 204 performs the steps of the techniques by executing instructions brought to RAMs 208. In alternative embodiments, hard-wired circuitry may be used in place of or in combination with software instructions to implement the described techniques. Consequently, embodiments of the invention are not limited to any one or a combination of firmware, software, hardware, or circuitry.

Instructions executed by CPU 204 may be stored in and/or carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, etc. As an example, the instructions to be executed by CPU 204 are in the form of one or more firmware or software programs and are initially stored in a CD-ROM being interfaced with computer system 200 via bus 224. Computer system 200 loads these instructions in RAMs 208, executes some instructions, and sends some instructions via communication interface 220, a modem, and a telephone line to a network, e.g. network 240, the Internet 252, etc. A remote computer, receiving data through a network cable, executes the received instructions and sends the data to computer system 200 to be stored in storage device 216.

In one embodiment, server 110, implemented as a computer 200, includes a power manager 280 responsible for managing system power of server 110. Manager 280 is implemented as a software package running on server 110. However, manager 280 can run on any other computer conveniently connected to network 100. For illustration purposes, power manager 280 is shown in memory 208 where is it executed.

Resources Consuming Power

Various components in server 110, including, for example, CPUs 204, memory 208, storage device 216, cards for connecting accessories, peripheral devices such as printers and external disks, etc., usually consume significant power. However, each of these components provides interfaces through which the power can be controlled. Depending on the component, the interface, and the manufacturers, etc., an interface can be hardware, firmware, software, hardware working in conjunction with firmware drivers and/or software, etc. Those skilled in the art will recognize that firmware can be invoked by another firmware or software program. In one embodiment, manager 280, based on instructions and specifications of the interface, controls the components and thus their power consumption.

The total power consumed by CPU 204 depends on a number of parameters such as the clock frequency at which a processor is running, the duty cycle, the number of processors active in the system, etc. Duty cycle is the time for which a processor runs at normal speed divided by the total time. Currently, under normal working conditions, to deliver the maximum computational power, CPU 204 in server 110 usually runs at its maximum clock rate. However, in accordance with the techniques of the invention, when the maximum computational power is not required, manager 280 reduces and/or adjusts one or a plurality of the above parameters to reduce the power consumed by CPU 204 and hence by server 110. For example, in one embodiment, a CPU 204 implemented as a Pentium 4 manufactured by Intel Corporation of Santa Clara, Calif., includes a Thermal Control Circuit (TCC) interface. To control the speed of CPU 204 and thus its power consumption, manager 280, through the TCC interface, follows the CPU specifications and instructions to alter the duty cycle of any processor in CPU 204. Manager 280, when appropriate, also sets this duty cycle to zero, which effectively halts CPU 204 even though it is still powered on. In another embodiment, manager 280, through an application using the ACPI interface, turns off CPU 204 implemented by the Intel's processor chips and board designs. In another embodiment, manager 280 via a CPU board interface reduces the clock speed driving CPU 204.

In one embodiment, RAMs 208 operate in a slow RAM refresh and a hibernate mode in which the data is swapped to disk. To reduce power consumption, manager 280 puts RAMs 208 in either one of those two modes because either mode requires less power than the normal operating mode. Disk drives being implemented as storage device 216 also include interfaces through which manager 280 spins down the disk drives for them to operate in a low power mode. In this mode, the disk platters stop rotating.

In one embodiment, manager 280 uses the Advanced Configuration and Power Interface (ACPI) standard to reduce the power consumption of server 110. In the S0 state, server 110 operates normally at its full power. In the S1 state, manager 280 stops CPU 204 and refreshes RAMs 208 so that server 110 runs in a low power mode. In the S2 state, manager 280 puts CPU 204 in a "no power" mode, refreshes RAMs 208, and server 110 is in a lower power mode than the S1 state. In the S3 mode, manager 280 puts CPU 204 in the "no power" state, RAMs 208 in a slow refresh state, and the power supply of server 110 in a reduced power mode. In the S4 or hibernate state, manager 280 shuts off the hardware completely and saves the system memory to disk. In the S5 state, manager 280 shuts off the hardware completely, shuts down the operating system running server 110, and server 110 requires a reboot to return to the normal operating state.

Power Management Based on System Component Loads and Independent of Program Applications To determine system performance, in one embodiment, manager 280, independent of program applications running on server 110, measures the system load by the degree of utilization of system components, such as CPU, memory, disk drives, bus, etc. Further, CPU utilization is defined as % (100*(total time–idle time)/total time); disk and memory I/O utilization is defined as % (100*(max rate–actual rate)/max rate), and bus utilization is defined as % ((100*current data rate of the bus)/max data rate).

For illustration purposes, CPU performance is used as an example. However, the illustrative concept can be used for other components of server 110 and for performance parameters discussed below. To obtain the utilization values, manager 280, in one embodiment, uses the operating-system-provided application programming interfaces such as the Win32 API for Microsoft Windows operating system. Manager 280 then uses the obtained utilization values to calculate the mean and standard deviation of CPU utilization as:

$$\bar{x} = \frac{1}{n}\sum_{i=1}^{i=n} x_i \tag{1}$$

$$\sigma = \sqrt{\frac{1}{(n-1)}\sum_{i=1}^{i=n}(x_i - \bar{x})^2} \tag{2}$$

wherein
$x_i = i_{th}$ value of the measured CPU utilization
$\bar{x}$ = mean CPU utilization over a set of n measurements
$\sigma$ = standard deviation Manager 280 also calculates the spare capacity as:

$$s = (100 - (\bar{x} + m^*\sigma)) \tag{3}$$

wherein m is a tunable parameter which represents a safety margin required in terms of the number of standard deviations. Parameter m is chosen based on the probability or percentage of time acceptable to have the CPU saturated, e.g., when it reaches a predefined value of utilization. Beyond this point, the CPU or system performance is considered degraded. For illustration purposes, the CPU is considered saturated when it reaches 100% utilization. However, other values close to 100% such as, 90%, 95%, etc., are within the scope of the invention.

The relationship between parameter m and the probability of having the CPU saturated is given by the equation:

$$P(m) = 1 - \frac{1}{\sigma\sqrt{2\pi}}\int_{-\infty}^{z} e^{-\frac{(x_i-\bar{x})^2}{2\sigma^2}} dx \tag{4}$$

Alternatively, this relationship is shown in table 300A and table 300B included in FIG. 3A and FIG. 3B, respectively.

In one embodiment, manager 280 changes operation of server 110, e.g., changes the clock speed or duty cycle required to obtain the desired change in CPU utilization as:

$$\Delta c = -s + H \tag{5}$$

where H is a value desirable for the spare capacity to reach. For example, if the current spare capacity is at 10%, and it is desirable for the spare capacity to be at 0%, then manager 280 causes the clock speed to be reduced by 10%, e.g., $\Delta c = -10\% + 0\% = -10\%$. However, if the spare capacity is to be at 5%, then $\Delta c = -10\% + 5\% = -5\%$. If the spare capacity is to be at 10%, then $\Delta c = -10\% + 10\% = 0\%$, etc. Alternatively, the spare capacity may be acceptable if it is within a range, e.g., from 0 to value H. For illustration purposes, the spare capacity is to be at 0%.

In general, after the clock speed is adjusted according to equation (5), the parameter m translates to a probability that the CPU will be saturated during its performance. For example, if $\bar{x}=40\%$, m=2 and $\sigma=10$, then, from equation (3), s=40%, and, from equation (5), $\Delta c=-40\%$. In this example, as m=2, equation (4) or table 300A provides that P(2)=2.275. That is, the probability for CPU to be saturated is 2.275%. Further, since $\Delta c=-40\%$, the clock speed or duty cycle of the CPU may be reduced by 40% while still achieving the objective of not saturating the CPU for more than 2.275% of the time.

As another example, if m=3, then using the above equations and table 300, P(3)=0.135% and Δc=−30%. Alternatively speaking, there is a 0.135% probability that the CPU will be saturated after the clock speed has been reduced by 30%. If m=0, then P(0)=0.5 and Δc=−60%, or there is a 50% probability that the CPU will be saturated after the clock speed has been reduced by 60%. Thus, a higher value of parameter m implies a greater margin of safety but also reduces the opportunity for reducing the CPU speed and hence the power consumption.

Conversely, if the system load increases after the CPU speed has been reduced as illustrated above, then the CPU speed is increased as determined by equation (5). For example, if m=2, $\bar{x}$=90, and σ=10, then, from equation (3), the spare capacity s=−10. Hence, by equation (5), Δc=10. The clock speed is thus increased by 10% to restore the desired power-performance tradeoff at the desired safety margin. Similarly, if m=3, $\bar{x}$=90, and σ=10, then s=−20, and Δc=20. The clock speed is accordingly increased by 20% to achieve the desired tradeoff.

In one embodiment, power manager 280 periodically measures the utilization values for a system resource over a period of time, and, from those values, manager 280 approximates or determines the statistical distribution with its mean and variance. For example, for every 10 minutes, manager 280 obtains 60 values of utilization $x_i$ each at every 10 seconds, and, based on those 60 values, calculates the mean, standard deviation, spare capacity, etc. In one embodiment, the statistical distribution is acquired using the normal or Gaussian distribution. The period for acquiring the utilization values, normally referred to as the sampling period, and the number of samples $x_i$ vary depending on various factors including whether the system utilization is stable or fluctuates, which in turn may depend on the time of the day, the day of the week, etc. For example, during daytime the system loads may fluctuate more often because different working customers request different services. Consequently, the sampling period during this time is shorter than that at nighttime or weekends where system utilization is more stable. Similarly, the number of samples is higher during weekdays than during nighttime and weekends.

Generally, the value of parameter m is selected based on the probability distribution that describes the measured data and the required safety margin, which is the acceptable probability for a system resource, e.g., the CPU, to reach saturation. In one embodiment, this probability and/or parameter m is agreed in a Service Level Agreement. If the service application is critical such that system saturation must be avoided as much as possible, then parameter m is selected as high as, e.g., 5. However, if the application is not that critical, then m can be selected as 0, and, as explained above, with m equals to 0, there is a 50% chance that the CPU reaches saturation after the CPU clock rate has been adjusted as prescribed by equation (5).

In one embodiment, having the acceptable value m for the safety margin for each resource, manager 280 brings the spare capacity s corresponding to that resource to a pre-defined range, which is as close to zero as practical. This optimizes system power for system resources. Depending on the resources, different variables are adjusted to adjust the spare capacity. For example, in a single processor situation, the clock speed corresponding to the processor utilization is adjusted as illustrated above. In case of multiple processors, turning on and off one or more processors is applicable. For example, if 4 processors are running, and, if the spare capacity is at 50% or higher, then 2 processors may be turned off to lower the spare capacity. If the resource is a disc drive, then the spinning speed is adjusted, etc.

FIG. 3A includes table 300A showing the first relationship between parameter m and the probability P(m) that CPU utilization will reach 100%. In this table 300A, the probability P(m) can be obtained having a value m. For example, for a value of m=−2.99, row −3.0 and column 0.01 are selected in which m=−3.0+0.01=−2.99 and P=99.861. Alternatively speaking, P(−2.99)=99.861. In this example, for a value of m=−2.99, there is a probability of 99.861% that CPU utilization will reach 100%. Similarly, if m=1.01, row 1 and column 0.1 are selected in which m=1+0.1=1.01 and P=15.625; or P(1.01)=15.625. As such, for a value of m=1.01, there is a probability of 15.625% that CPU utilization will reach 100%.

FIG. 3B includes table 300B showing the second relationship between parameter m and the probability P(m) that CPU utilization will reach 100%. In this table 300B, a value of parameter m can be obtained having a probability P. For example, for a probability of 49%, row 48 and column 1 are selected in which P=48+1=49 and m=0.0251. In this example, if CPU utilization at 100% is acceptable for 49% of the time, then m=0.025 is selected for use in equation (3). Similarly, for a probability of 2.8%, then row 2 and column 0.8 are selected in which P=2+0.8=2.8, and m=1.911. As such, if CPU utilization at 100% is acceptable for 2.8% of the time, then m=1.911 is selected for use in equation (3). Those skilled in the art will recognize that table 300A and 300B are different expressions of the above equation (4).

Power Management Based on Application Performance or Service Level Agreements

Besides system resource utilization, manager 280 measures system performance based on applications running on server 110 and/or performance parameters defined by a Service Level Agreement (SLA). These parameters include, for example, the response time, the number of user authentications or the number of web pages provided per a time unit, etc. The response time may be defined in various ways such as the period of time from the time a user requests a service to the time the user receives the response, the time it takes an application to service a request, etc. Manager 280 accesses performance parameters via an application interface (API). In one embodiment, manager 280 measures the parameters by calling an appropriate API and compares them to what is required pursuant to the Service Level Agreements, which, in one embodiment, represents a threshold. If the performance delivered by server 110 is better than the threshold, then manager 280 reduces the power consumption by one or a combination of the mechanisms described above. That is, manager 280 reduces the clock speed, turns off some processors, spins down the disc drives, etc. Similarly, when server 110 cannot perform pursuant to the SLA, manager 280 increases system power so that server 110 can increase its performance and thus meet the SLA requirements.

Usually, one or a combination of resource utilization parameters affects an SLA parameter. For example, one or a combination of the CPU utilization, the disk access time, etc., affects the response time in retrieving a web page, the number of user authentications per minute, etc. In one embodiment, to meet the SLA requirements, manager 280 considers the correlation between pairs of parameters. For illustration purposes, a pair of variables x and y corresponding respectively to the mean of the CPU utilization and the mean of the response time to serve a web page is used. Manager 280 determines the correlation between variable x and variable y. In one embodiment, manager 280 uses tools such as SightLine by Fortel Inc., of Fremont, Calif. to acquire a correlation coefficient $\rho_{x,y}$, which indicates the degree of correlation between variable x and variable y. Coefficient $\rho=1$ implies that x and y are correlated, and, that is, if x changes by a percentage amount, then y changes by the same amount. For example, if x changes by 10%, then y changes by 10%. If x changes by 20%, then y changes by 20%, etc. In contrast, if $\rho=0$, then x and y are independent and therefore changing one parameter has no effect on the other. However, if $\rho$ is between 0 and 1, then there is some degree of correlation between x and y.

Manager 280 uses the following equation (6) to determine the probability distribution function for a bivariate distribution of x and y:

$$f(x, y) = \frac{1}{2\pi\sigma_x\sigma_y\sqrt{1-\rho^2}} \exp\left\{\frac{-1}{2(1-\rho_{x,y}^2)}\left[\left(\frac{x-\bar{x}}{\sigma x}\right)^2 - 2\rho_{x,y}\left(\frac{x-\bar{x}}{\sigma_x}\right)\left(\frac{y-\bar{y}}{\sigma_y}\right) + \left(\frac{y-\bar{y}}{\sigma_y}\right)^2\right]\right\}$$

where:
x=mean value of the first variable, e.g., mean of CPU utilization values
$\bar{x}$=mean of the mean values of x
y=mean value of the second variable, e.g., mean of response time values for serving a web page
$\bar{y}$=mean of the mean values of y
$\sigma_x$=standard deviation of x
$\sigma_y$=standard deviation of y
$\rho_{x,y}$=correlation coefficient between x and y To establish function $f(x,y)$ in equation (6), manager 280 periodically measures a plurality of corresponding pairs of response time and CPU utilization, and, for each set of the measured values, calculates the corresponding means. Similarly, manager 280, from a plurality of sets of values, or a plurality of the means, calculates the means of the means and corresponding standard deviations.

Function $f(x,y)$ may be represented in a 3-axis graph including coordinates x, y, and $f(x,y)$ in which the x-axis and the y-axis form an x-y plane. From equation (6), a trend line representing the relationship between variable x and variable y is obtained. This trend line is the locus of the maximum points of $f(x,y)$ projected onto the x-y plane and is determined using the equation $$\frac{\partial f(x, y)}{\partial y} = 0.$$

Based on mathematical calculations, this trend line is represented by the equation:

$$Y = \rho_{x,y}\frac{\sigma_y}{\sigma_x}X - \rho_{x,y}\frac{\sigma_y}{\sigma_x}\bar{X} + \bar{Y} \tag{7}$$

and thus provides a slope:

$$p = \rho_{x,y}\frac{\sigma_y}{\sigma_x} \tag{8}$$

Figure 4:
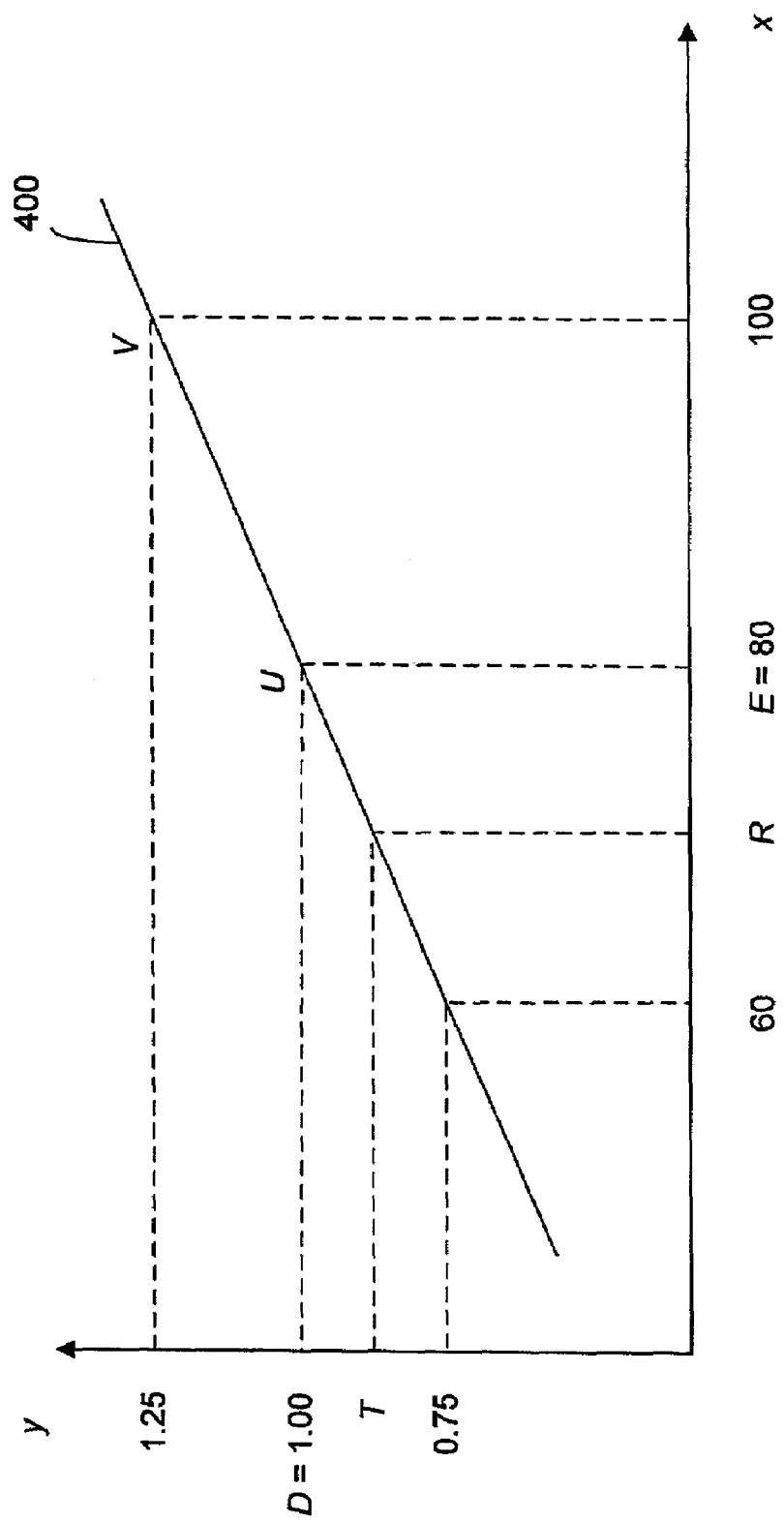
FIG. 4 shows a trend line for two variables x and y.

FIG. 4 shows an example of a trend line 400 in which the x-axis represents the mean of the CPU utilization while the y-axis represents the mean of the response time in second. On trend line 400, point U indicates that, for 50% of the time, the response time is at one second or less while CPU utilization is at 80%; point V indicates that, for 50% of the time, the response time is at 1.25 seconds or less while CPU utilization is at 100%, etc.

Manager 280, based on the Service Level Agreement, establishes a desired value D for variable y, and a confidence level associated with this desired value D. This confidence level indicates the probability for variable y to be at or below value D. For illustration purposes, D is at one second, and if the confidence level is 60%, 70%, or 80%, then there is a probability that 60%, 70%, and 80%, respectively, that the mean of the response time is one second or less. Those skilled in the art will recognize that if the confidence level is 50%, then value D corresponds to a point on trend line 400, which, is point U. Further, the corresponding CPU utilization value is 80%, or value E, on the x-axis. However, if it is desirable to achieve the desired value D 95% of the time, then manager 280 selects a target response time T on the y-axis that is faster than one second. This target value T provides the margin so that 95%, instead of 50%, of the time the response time is below the desired value D of one second. In one embodiment, manager 280 uses variable m to determine the probability of 95%, which, in table 300B yields that m equals to 1.6449. Variable m is also the number of standard deviations below the desired value D to achieve value T. The relationship between value T and value D is $$T=D-(m*\sigma_y) \tag{9}$$

Manager 280 uses the following equation to determine the spare capacity expressed in terms of the number m of standard deviations of variable y:

$$S_{\sigma_y} = \frac{(T-A)}{\sigma_y} - m \tag{10}$$

where:
$S_{94_y}$=spare capacity
T=target value for y
A=actual value for y
$\sigma_y$=standard deviation for y
m=the number of standard deviations corresponding to a desired confidence In equation (10), value A represents the actual or real time value of variable y that is normally acquired soon before calculating equation (10). In embodiments where variable y is the mean of the response time, this value A is determined based of a plurality of values of response time that are measured periodically.

Based on value T, manager 280 determines a corresponding CPU utilization R, which indicates that when CPU runs at value R, there is a 95% confidence level that the response time is at or below value D, or one second in the above example.

Using trend line 400, Δx, the change in variable x from value E to value R that corresponds to the change from value D to value T, is calculated as:

$$\Delta x = \frac{S_{\sigma_y}}{p}$$

where, ρ is the slope of trend line 400, which is defined in equation (8) above. Δx may be referred to as the spare capacity of variable x, or the spare capacity of CPU utilization.

In one embodiment, manager 280 changes operation of server 110, e.g., changes the clock speed or duty cycle required to obtain the desired change in CPU utilization as:

$$\Delta c = -\Delta x + G$$

where G is a value desirable for the spare capacity to reach. For example, if the current spare capacity is 10%, and it is desirable for the spare capacity to be at zero, then manager 280 causes the clock speed to be reduced by 10%, e.g., Δc=−10%+0%=10%. However, if the spare capacity is to be at 5%, then Δc=−10%+5%=−5%. If the spare capacity is to be at 3%, then Δc=−10%+3%=−7%, etc. Alternatively, the spare capacity is acceptable if it is within a range, e.g., from 0 to value G.

Manager 280 also saves power by one or a combination of various techniques such as optimizing performance, combining services performed by various servers 110, satisfying predefined conditions, turning off non-essential or non-critical programs, etc.

Performance Optimization

Because performance optimization creates greater system spare capacity for a given load, power manager 280 uses performance optimization to reduce power consumption while maintaining the same system performance. In one embodiment, to periodically optimize system performance, a system administrator, depending on the operating environment, uses one of several available tools such as OpenView, GlancePlus, GlancePlus Pak 2000 by Hewlett-Packard Company of Palo Alto, Calif., Unicenter Performance Management for open VMS by Computer Associates International of Islandia, N.Y., Tivoli Application Performance Management by IBM of Armonk, N.Y., etc. Normally, soon after performance optimization, manager 280 uses one of the power-saving techniques to manage system power.

In one embodiment, performance optimization is achieved by tuning various "tunable" parameters that can be dynamic or static. Dynamic parameters can be changed during normal system operations and do not require a re-boot. Dynamic parameters include, for example, priority levels of all applications and services running on server 110, application level memory cache size for caching web pages and intermediate query results for data bases, the number concurrent users accessing a service or logins to a service, CPU time slice limit for applications, etc. Static parameters require re-booting the system to take effect, and include parameters such as Redundant Array of Independent Disk (RAID) configurations, swap page size, system memory size, system cache size, etc.

Groups and Clustered Systems

In one embodiment, when a group of servers 110 are being run in a clustered or load-balanced environment, manager 280, based on the performance of each server 110 and when appropriate, consolidates the program applications to fewer systems. For example, if two servers 110-1 and 110-2 provide web page services, and if the sum of the spare capacity of the two servers exceeds 100% then server 110-1 is put into a higher "sleep" state such as the S4 or S5 state or even shut-down, and server 110-2 executes applications of its own and of server 110-1. For another example, the spare capacity of server 110-3 is 20% with a database application running, and this capacity increases to 50% without the database application. In one embodiment, the database application on server 110-3 is turned off or transferred to e.g., a server 110-4, so that the 50% capacity of server 110-3 can be used to provide services that require 50% capacity and are being run from, e.g., server 110-5. In one embodiment, the spare capacity of a server is the spare capacity of the CPU. In many situations, service combinations result in a higher power saving than reducing the power of some resources in each server individually.

Predefined Conditions

Manager 280 executes power management also based on predefined conditions and requirements. In special or exception conditions, manager 280, based on configuration information that has been previously provided and when appropriate, turns off programs or applications that are not absolutely required or non-essential under the prevailing environment conditions. Turning off non-essential programs or non-critical services boosts the performance of other services resulting in extra capacity. Special conditions are triggered by external events such as "brown-out" conditions, excessive electricity price periods, smog and "save-the-air" advisories, local facilities air-conditioning overload due to hot weather, etc.

Steps Illustrating a Method for Managing System Power

Figure 5A:
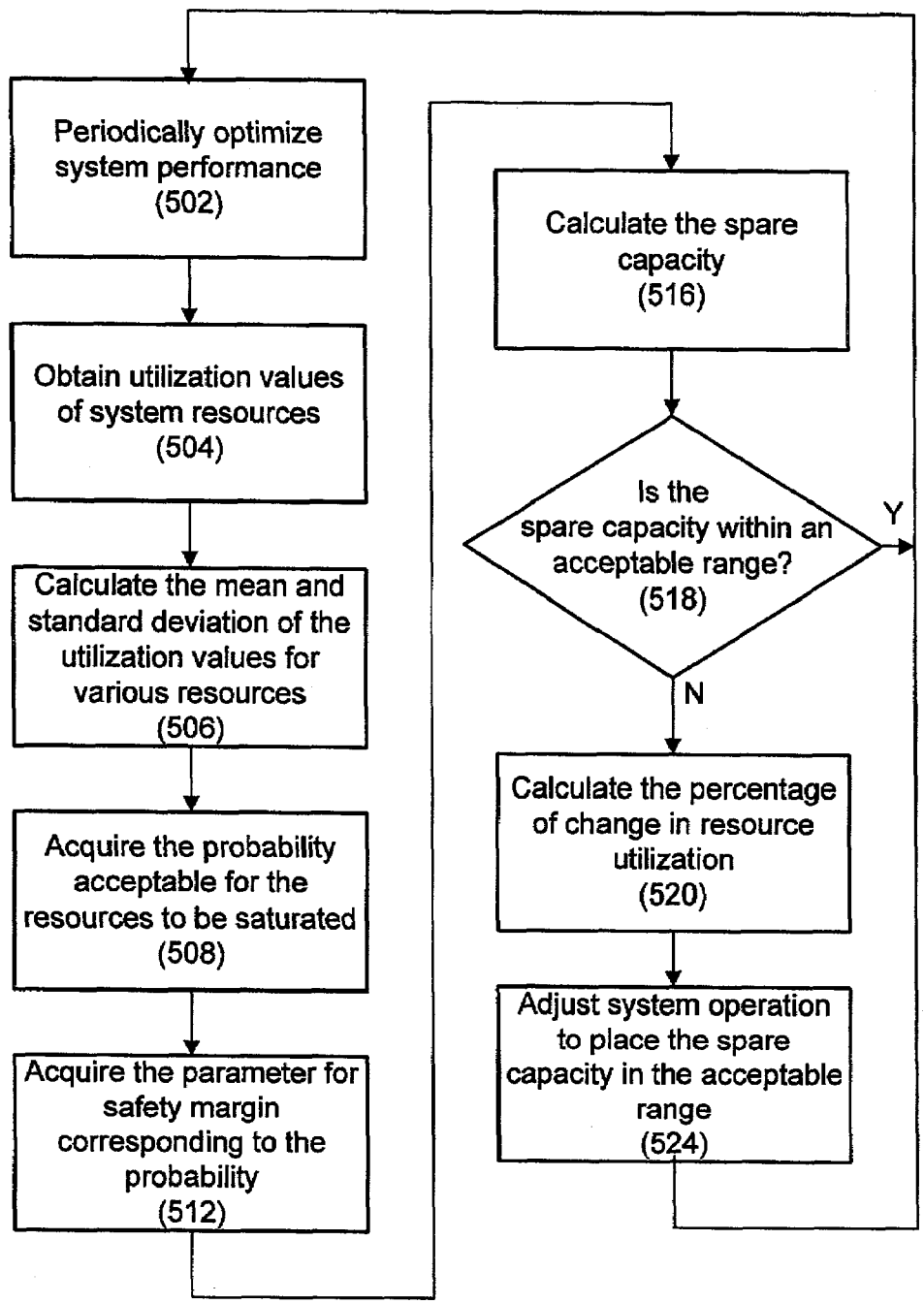
FIG. 5A is a flowchart illustrating the steps in managing system power, in accordance with one embodiment.

FIG. 5A is a flowchart illustrating a method for managing system power in accordance with one embodiment.

In step 502, manager 280 periodically optimizes system performance.

In step 504, manager 280 obtains the utilization values $x_i$ of various system resources over a set of n measurements.

In step 506, manager 280 calculates the means $\overline{x}$ and standard deviation σ of $x_i$ for the corresponding resources.

In step 508, manager 280 acquires the probability acceptable for the resources to be saturated. That is, manager 280 acquires the probability P of equation (4).

In step 512, manager 280, from the probability P, acquires parameter m.

In step 516, having the values of $\overline{x}$, σ, m, manager 280 calculates the spare capacity s.

If step 518 determines that the spare capacity is within an acceptable range, then the system is operating acceptably, and the method flows to step 502.

However, if step 518 indicates that the spare capacity s is not within the acceptable range, then manager 280 in step 520 calculates the percentage of change in resource utilization Δc.

In step 524, to reflect the change in Δc, manager 280 adjusts the system operation such as CPU clock speed. Once the resource utilization is adjusted, the spare capacity s should be in an acceptable range. The method flows to step 502 and the power managing process continues.

Figure 5B:
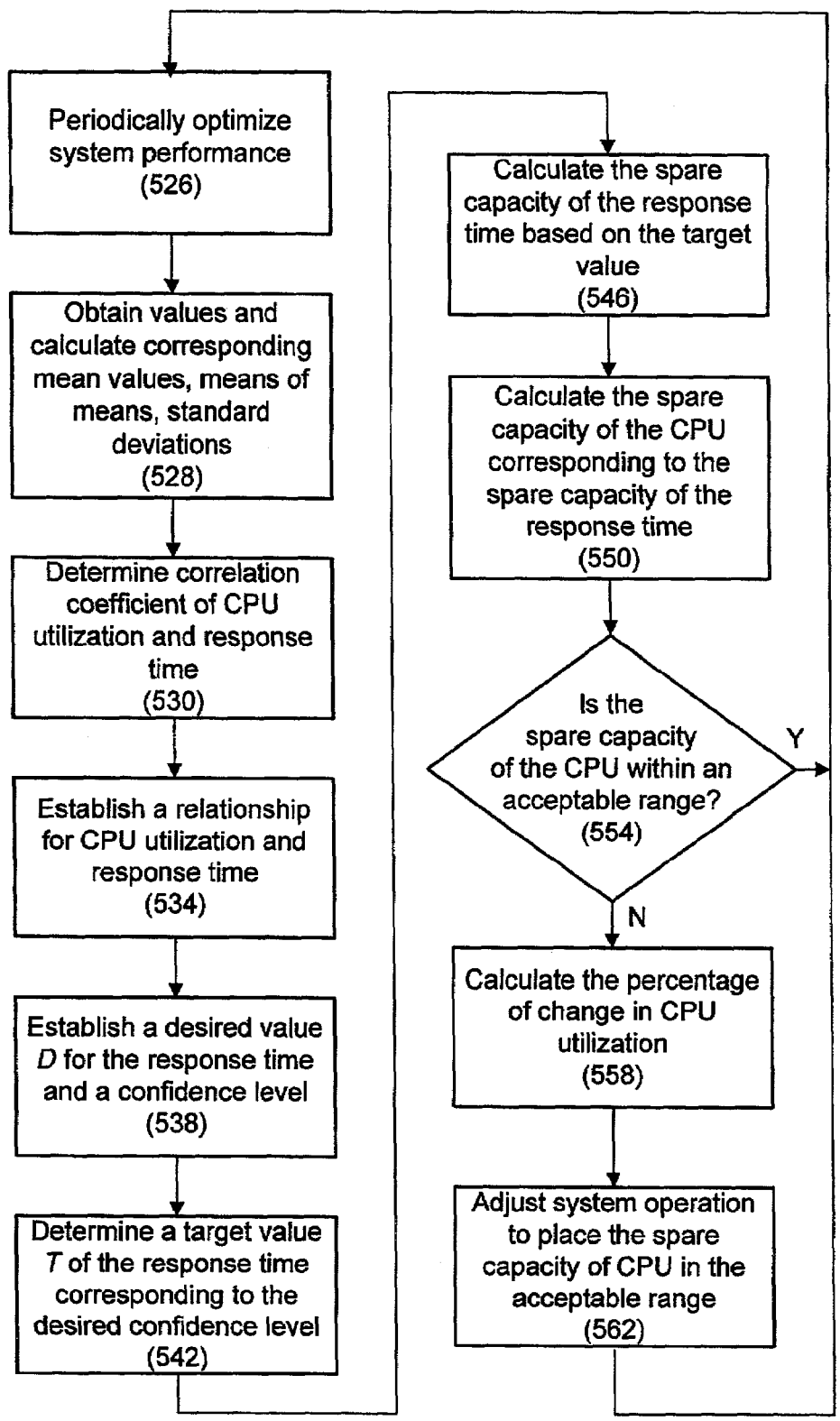
FIG. 5B is a flowchart illustrating the steps in managing system power related to an SLA parameter, in accordance with one embodiment.

FIG. 5B is a flowchart illustrating a method for managing system power related to an SLA parameter, in accordance with one embodiment.

In step 526, manager 280 periodically optimizes system performance.

In step 528, manager 280 samples the response time and corresponding CPU utilization. From each set of samples, manager 280 obtains a corresponding mean value, and, from a plurality of sets of samples, manager 280 obtains the means of the means and corresponding standard deviations.

In step 530, manager 280 determines the correlation coefficient between the CPU utilization and the response time.

In step 534, manager 280 establishes a relationship, e.g., in the form of a trend line for the response time and CPU utilization.

In step 538, manager 280, based on the Service Level Agreement, establishes a desired value D for the response time, e.g., one second, and a confidence level associated with this desired value D. If the confidence level is 50%, then the CPU utilization corresponding to this desired value D can be obtained directly from equation (7). However, for illustration purposes, the confidence level is more than 50%, e.g., 95%.

In step 542, manager 280, determines a target response time value, e.g., value T, which is faster than one second so that if the response time is at value T, then there is 95% percent probability that the response time will be below the desired value D.

In step 546, manager 280, based on the target value T, calculates the spare capacity of the response time.

In step 550, manager 280 calculates the spare capacity of the CPU corresponding to the spare capacity of the response time.

If step 554 determines that the CPU spare capacity is within an acceptable range, then the system is operating acceptably, and the method flows to step 526. However, if step 554 indicates that the spare capacity is not within the acceptable range, then manager 280 in step 558 calculates the percentage of change in CPU utilization.

In step 562, manager 280 adjusts operation of server 110 including adjusting the clock speed of the CPU so that the spare capacity of CPU is at the acceptable level. The method flows to step 526 and the power managing process continues.

During the above steps in FIGS. 5A and 5B, manager 280 may turn off some programs applications as some of the predefined conditions are met, consolidating program applications, etc.

The Power Manager

Figure 6:
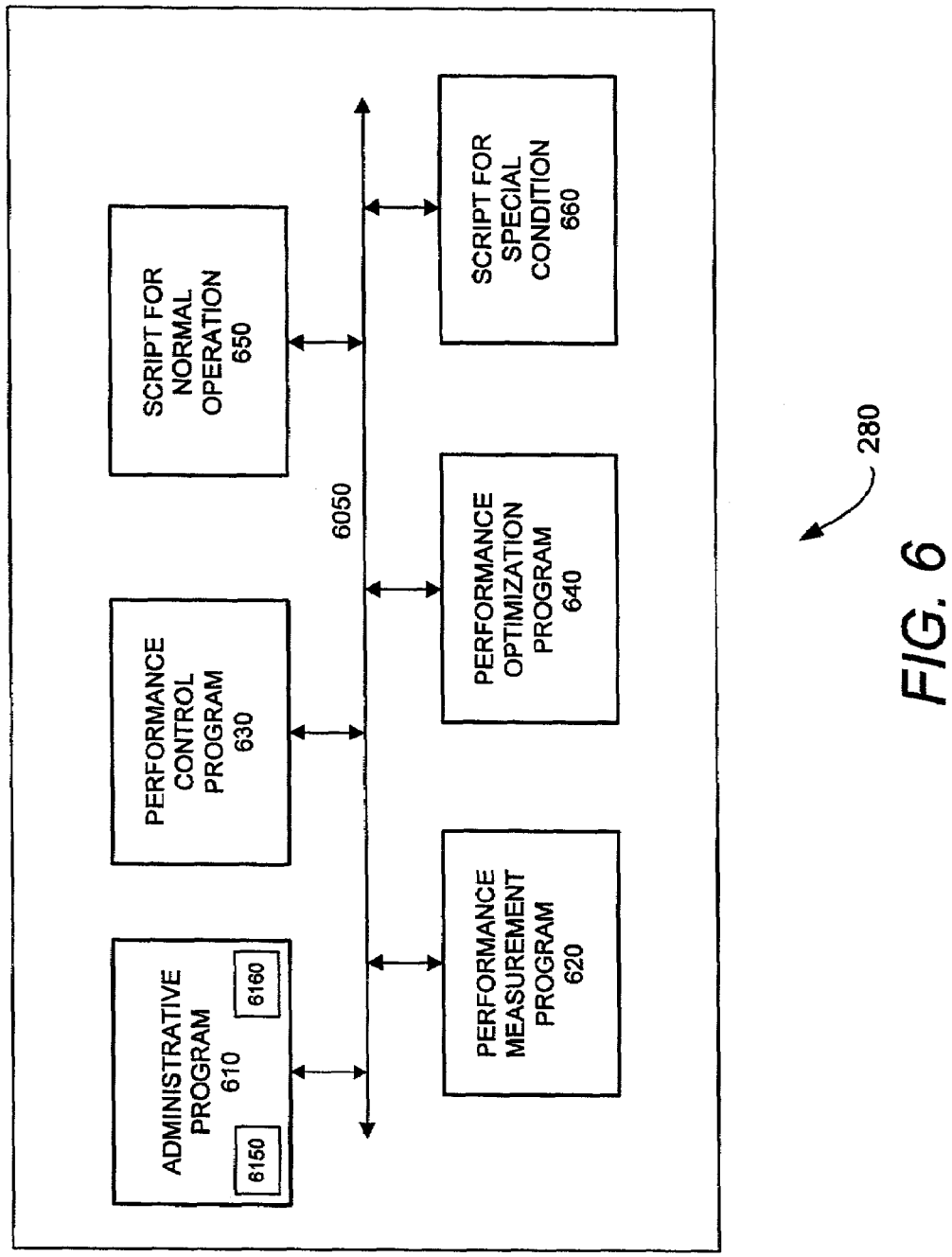
FIG. 6 shows a power manager in accordance with one embodiment.

FIG. 6 shows one embodiment of power manager 280 including an administrative program 610, a performance measurement program 620, a performance control program 630, a performance optimization program 640, and program scripts 650 and 660, all of which communicate via a bus 6050.

In one embodiment, program 610 is executed as a Windows Service or Unix Demon, and includes an administrative user interface 6150 and a start-up program 6160. User interface 6150 allows a user to enter configuration information, execute commands, scripts, and/or make choices in a graphic user interface (GUI). Start-up program 6160 launches performance measurement program 620, performance control program 630, and scripts at start up time and does initialization work such as reading configuration that might have been previously entered and saved via interface 6150.

Performance measurement program 620 monitors performance of system resources and of parameters included in Service Level Agreements. Performance program 620 computes the statistical mean and standard deviation of performance parameters and compares to what is required pursuant to the Service Level Agreement. Program 620 also computes the spare capacity values. Program 620, via appropriate component and application interfaces, continuously measures and records these parameters, and, when desired, signals control program 630 to take appropriate actions to manage the power.

Performance control program 630 employs one of the power-saving methods to reduce or increase power. Control program 630 includes information and interfaces required to control the system resources. For example, control program 630, via the TTC circuit, reduces or increases the effective clock speed of the CPU, spins the disc drives up or down or turning them on or off as appropriate.

Performance optimization program 640 in one embodiment builds a dynamic model for the relationship between system performance and "tunable" parameters. Based on the model, program 640 adjusts these parameters to optimize system performance, and as discussed above, once the system is optimized, measurement program 620 and control program 630, as appropriate, apply one of the various power-saving techniques discussed above.

Scripts 650 and 660 execute power management policies based on prevailing conditions and requirements. In one embodiment, script 650, executing for normal operation, implements logic to collect and analyze performance information. For example, script 650 invokes performance measurement program 620 to compute the statistical mean and standard deviations of performance parameters, to measure the spare capacity, etc. Based on the measurement results, script 650 invokes control program 630 to control power.

Script 660 provides the logic to deal with exception operating condition. Based on configuration information, script 660 turns off or on corresponding programs. For example, when the "brown-out" condition is met, script 660 invokes program control 630 for it to reduce power. Script 660 also turns off non-essential programs, etc.

Illustration of Executing the Power Manager

Figure 7:
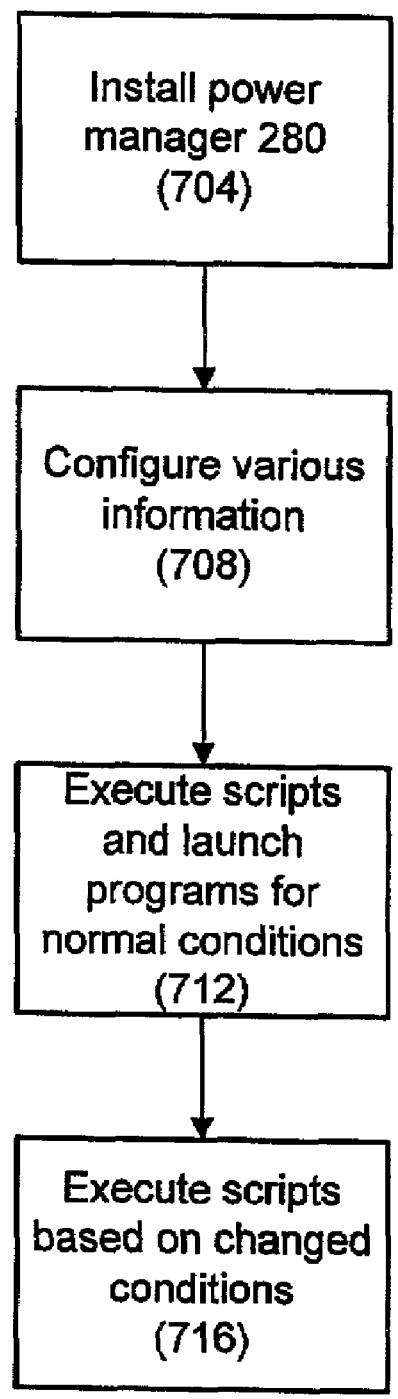
FIG. 7 is a flowchart illustrating an execution of the power management in accordance with one embodiment.

FIG. 7 is a flowchart illustrating a method for executing the power management in accordance with one embodiment.

In step 704, a system Administrator installs power manager 280 on server 110.

In step 708, the Administrator, via interface 6150, configures various information such as the times during the day the programs and services run on server 110. The Administrator identifies the programs that are optional but desirable to run if conditions permit, the programs that are not required to run but can be executed on demand, etc. The Administrator maps the applications to the times during which the applications may be turned off, given lower priority, or be available for execution on demand, etc. The Administrator maps script 650 to normal conditions and script 660 to exception conditions. The Administrator programs the scripts to be executed when the condition is met.

The Administrator often changes the information and mapping in this step 708 as appropriate.

In step 712, after a system boot, program 610 executes scripts 650 for normal operation. Program 610 also launches program 620 and program 630 to measure and optimize system performance.

In step 716, when external environment conditions vary, the Administrator uses interface 6150 to issue commands notifying power manager 280 of the changes. Based on the new conditions, power manager 280, via program 610, executes script 650 and 660 that have been configured for the new conditions.

In the foregoing specification, the invention has been described with reference to specific embodiments. However, it will be evident that various modifications and changes may be made without departing from the broader spirit and scope of the invention. Accordingly, the specification and drawings are to be regarded as illustrative rather than as restrictive.

What is claimed is:

1. A method for managing power of a system, comprising the steps of:
   identifying a resource consuming power of the system;
   periodically determining spare capacity of the resource including selecting a parameter based on probability for the resource to reach a predetermined level of utilization; and
   if the spare capacity is outside a predefined range, then adjusting operation of the system that affects power consumed by the system in order to adjust the spare capacity to within the predefined range;
   wherein the spare capacity is determined based on a statistical distribution of a number of utilization values of the resource; the number of utilization values being obtained periodically.

2. The method of claim 1 wherein the probability is agreed between a user using the system to provide a system service and a client requesting the service from the system; the service affecting the power consumed by the resource.

3. The method of claim 1 wherein the spare capacity is identified as a parameters calculated based on the equation $s=(100-(\bar{x}+m^*\sigma))$; $\bar{x}$ being the mean of the number of utilization values; $\sigma$ being the standard deviation of the number of utilization values, and m being the parameter chosen based on the acceptable probability for the resource to reach the predetermined level of utilization.

4. The method of claim 1 wherein the statistical distribution is selected as the Gaussian distribution.

5. The method of claim 1 further comprising the step of periodically optimizing performance of the system.

6. The method of claim 1 being for use in meeting a requirement agreed between a user using the system to provide a system service and a client requesting the service from the system; the service affecting the power consumed by the system.

7. The method of claim 1 further comprising the step of turning off a program application running on the system upon meeting a condition that affects the power consumed by the system.

8. The method of claim 1 further comprising the step of consolidating program applications based on the spare capacity of the resource.

9. The method of claim 8 wherein
   the step of consolidating comprising one or a combination of turning off a first application running on the system or on a second system, moving the first application to the second system,
   a second application being run on the second system or on a third system, and
   the system, the second system, and the third system are connected via a computer network.

10. The method of claim 1 wherein the system provides computer services to users via a computer network.

11. The method of claim 1 wherein
    if the resource is a processor, then adjusting operation of the system includes one or a combination of adjusting a clock frequency at which the processor is running, adjusting a duty cycle of a clock from which the processor is running, adjusting a number of processors running in the system;
    if the resource is a RAM then adjusting operation of the system includes putting the RAM in a selected mode; and
    if the resource is a disk drive, then adjusting operation of the system includes spinning down the disk drive.

12. A method for managing power of a system, comprising the steps of:
    periodically acquiring utilization values of a resource;
    calculating the mean and the standard deviation of the utilization values;
    acquiring a parameter reflecting a probability that the resource will reach a predetermined level of utilization;
    based on the mean, the standard deviation, and the parameter, acquiring spare capacity of the resource; and
    if the spare capacity is outside a predefined range, then adjusting operation of the system that affects power consumed by the resource in order to adjust the spare capacity to within the predefined range.

13. The method of claim 12 wherein $\bar{x}$ represents the mean, $\sigma$ represents the standard deviation, m represents the parameter, s represents the spare capacity, and the step of acquiring the spare capacity uses the equation $s=(100-(\bar{x}+m^*\sigma))$.

14. The method of claim 12 wherein the step of adjusting operation of the system comprising one or a combination of adjusting the speed of the resource, turning on or off part of the resource, turning off a program application running on the system, moving the application to another system, and optimizing performance of the system.

15. A computer-readable medium embodying instructions for
    managing power of a system, the instructions performing the steps of:
    identifying a resource consuming power of the system;
    periodically determining spare capacity of the resource including selecting a parameter based on probability for the resource to reach a predetermined level of utilization; and
    if the spare capacity is outside a predefined range, then adjusting operation of the system that affects power consumed by the system in order to adjust the spare capacity to within the predefined range;
    wherein the spare capacity is determined based on a statistical distribution of a number of utilization values of the resource; the number of utilization values being obtained periodically.

16. The computer-readable medium of claim 15 wherein the probability is agreed between a user using the system to provide a system service and a client requesting the service from the system; the service affecting the power consumed by the resource.

17. The computer-readable medium of claim 15 wherein the spare capacity is identified as a parameter s calculated based on the equation s=(100−($x$+m*σ)); $x$ being the mean of the number of utilization values; σ being the standard deviation of the number of utilization values, and m being the parameter chosen based on the acceptable probability for the resource to reach the predetermined level of utilization.

18. The computer-readable medium of claim 15 wherein the statistical distribution is selected as the Gaussian distribution.

19. The computer-readable medium of claim 15 further comprising instructions for periodically optimizing performance of the system.

20. The computer-readable medium of claim 15 being for use in meeting a requirement agreed between a user using the system to provide a system service and a client requesting the service from the system; the service affecting the power consumed by the system.

21. The computer-readable medium of claim 15 further comprising instructions for turning off a program application running on the system upon meeting a condition that affects the power consumed by the system.

22. The computer-readable medium of claim 15 further comprising instructions for consolidating program applications based on the spare capacity of the resource.

23. The computer-readable medium of claim 22 wherein the step of consolidating comprising one or a combination of turning off a first application running on the system or on a second system, moving the first application to the second system,
a second application being run on the second system or on a third system, and
the system, the second system, and the third system are connected via a computer network.

24. The computer-readable medium of claim 15 wherein the system provides computer services to users via a computer network.

25. A computer-readable medium embodying instructions for
managing power of a system, the instructions performing the steps of:
periodically acquiring utilization values of a resource;
calculating the mean and the standard deviation of the utilization values;
acquiring a parameter reflecting a probability that the resource will reach a predetermined level of utilization;
based on the mean, the standard deviation, and the parameter, acquiring spare capacity of the resource; and
if the spare capacity is outside a predefined range, then adjusting operation of the system that affects power consumed by the system to adjust the spare capacity to within the predefined range.

26. The computer-readable medium of claim 25 wherein $x$ represents the mean, σ represents the standard deviation, m represents the parameter, s represents the spare capacity, and the step of acquiring the spare capacity uses the equation s=(100−($x$+m*σ)).

27. The computer-readable medium of claim 25 wherein the step of adjusting operation of the system comprising one or a combination of adjusting the speed of the resource, turning on or off part of the resource, turning off a program application running on the system, moving the application to another system, and optimizing performance of the system.

28. A system comprising:
means for periodically acquiring utilization values of a resource;
means for calculating the mean and the standard deviation of the utilization values;
means for acquiring a parameterreflecting a probability that the resource will reach a predetermined level of utilization;
means for acquiring spare capacity of the resource based on the mean, the standard deviation, and
means for adjusting operation of the system so that if the spare capacity is outside a predetermined range then adjust operation of the system that affects power consumed by the system in order to adjust the spare capacity to within the predetermined range.

29. The system of claim 28 further comprising means for consolidating program applications; the means for consolidating uses the spare capacity as an input.

30. The system of claim 28 wherein
the system is identified as a first system, and
a program application runs on the first system or on a second system that is connected to the first system via a network.

31. The system of claim 28 wherein
if the resource is a processor, then adjusting operation of the system includes one or a combination of adjusting a clock frequency at which the processor is running, adjusting a duty cycle of a clock from which the processor is running, adjusting a number of processors running in the system;
if the resource is a RAM then adjusting operation of the system includes putting the RAM in a selected mode; and
if the resource is a disk drive, then adjusting operation of the system includes spinning down the disk drive.

* * * * *

UNITED STATES PATENT AND TRADEMARK OFFICE
CERTIFICATE OF CORRECTION

PATENT NO. : 6,996,728 B2  
APPLICATION NO. : 10/133730  
DATED : February 7, 2006  
INVENTOR(S) : Jitendra K. Singh It is certified that error appears in the above-identified patent and that said Letters Patent is hereby corrected as shown below:

In column 6, line 38, delete " $e^{-\frac{(x_i-\bar{x})^2}{2\sigma^2}} dx$ " and insert -- $e^{-\frac{(x-\bar{x})^2}{2\sigma^2}} dx$ --, therefor.

In column 10, line 50, delete " $S_{\text{o4}_y}$ " and insert -- $S_{\sigma_y}$ --, therefor.

In column 15, line 45, in Claim 3, delete "aparameters" and insert -- a parameter s --, therefor.

In column 18, line 22, in Claim 28, delete "parameterreflecting" and insert -- parameter reflecting --, therefor.

In column 18, line 26, in Claim 28, after "and" insert -- the parameter; and --.

Signed and Sealed this

Twenty-eighth Day of July, 2009

JOHN DOLL  
*Acting Director of the United States Patent and Trademark Office*